United States Patent

Lehtinen et al.

[11] Patent Number: 5,852,603
[45] Date of Patent: Dec. 22, 1998

[54] TRANSCEIVER WITH SWITCHABLE FREQUENCY BAND AND BANDWIDTH

[75] Inventors: Kari Lehtinen, Salo; Mikko Pesola, Marynummi, both of Finland

[73] Assignee: Nokia Mobile Phones Limited, Salo, Finland

[21] Appl. No.: 806,439

[22] Filed: Feb. 26, 1997

[30] Foreign Application Priority Data

Feb. 29, 1996 [FI] Finland .................................. 960947

[51] Int. Cl.[6] .................................................. H04J 3/00
[52] U.S. Cl. ............................................. 370/280; 370/281
[58] Field of Search ................................... 370/252, 333, 370/468, 347, 350, 508, 519, 280, 281, 294–296, 276, 282, 321, 337, 344, 336, 319, 442, 480, 503; 455/517, 5.1, 509; 375/219, 354, 359, 202, 261, 355, 356, 361, 362, 364

[56] References Cited

U.S. PATENT DOCUMENTS

| 5,291,474 | 3/1994 | Ikonen et al. | 370/30 |
| 5,301,367 | 4/1994 | Heinonen | 455/76 |
| 5,390,168 | 2/1995 | Vimpari | 370/30 |
| 5,465,409 | 11/1995 | Borras et al. | 455/260 |
| 5,471,652 | 11/1995 | Hulkko | 455/76 |
| 5,519,885 | 5/1996 | Vaisanen | 455/76 |
| 5,745,480 | 4/1998 | Behtash et al. | 370/252 |
| 5,754,961 | 5/1998 | Serizawa et al. | 370/343 |

FOREIGN PATENT DOCUMENTS

0496498 A3  7/1992  European Pat. Off. .

OTHER PUBLICATIONS

24th European Microwave Conference, 5–8 Sep. 1994, Cannes pp. 1575–1580; Lehtinen et al., "High frequency part of a real time test mobile station for UMTS system evaluations".

Primary Examiner—Dang Ton
Attorney, Agent, or Firm—Perman & Green, LLP

[57] ABSTRACT

A transceiver is described which in a FDD mode of operation receives at a first frequency (F1) and transmits at a second frequency (F2); and in a TDD mode of operation receives and transmits at a third frequency (F3). The transceiver incorporates in a receiving branch at least a first mixer for forming a first intermediate frequency (IF1) from a received frequency (F1, F3) and a first local oscillator frequency (LO1); and a second mixer for forming a second intermediate frequency (IF2) from the first intermediate frequency (IF1) and the second local oscillator frequency (LO2). In a transmission branch the transceiver includes a modulator for modulating signals to be transmitted (TXI, TXQ) to a third intermediate frequency (IF3); a third mixer (16) for forming a transmission frequency (F2, F3) from a third intermediate frequency (IF3) and a fourth local oscillator frequency (LO4). Also included is a first synthesizer for forming equally high first and fourth local oscillator frequencies (LO1, LO4), and a second synthesizer and a frequency multiplier or divider and a switching arrangement for forming and switching a fourth frequency (FS) and its M times multiple (M*FS) such that the fourth frequency (FS) is an absolute value of the difference between the reception frequency (F1) and the transmission frequency (F2) of the FDD mode of operation divided by (M-1).

5 Claims, 4 Drawing Sheets

LO= LOCAL OSCILLATOR
IF= INTERMEDIATE FREQUENCY
SYN= SYNTHESIZER

LO = LOCAL OSCILLATOR
IF = INTERMEDIATE FREQUENCY
SYN = SYNTHESIZER

TRANSCEIVER WITH SWITCHABLE FREQUENCY BAND AND BANDWIDTH

FIELD OF THE INVENTION

The invention relates to a transceiver which has a switchable frequency band and bandwidth. The invention can be applied, for example, to mobile stations of the TDMA type, which are intended to operate alternatively either in the TDD (time division duplex) mode of operation or in the FDD (frequency division duplex) mode of operation in the corresponding, different cellular environments.

BACKGROUND OF THE INVENTION

The technical background of the invention is the development of future generations of mobile station systems. The object of this development is to attain mobile stations which can operate in different types of cells, ranging from indoor picocells up to large macrocells. The mobile stations of the future should also be capable of channel switching between different types of cells, in which the modulation schemes, carrier bit rates, frame and burst structures, channel spacings, transmission powers and duplexing methods can be different. In particular, the invention relates to the use of different duplexing methods, either time division duplexing (TDD) or frequency division duplexing (FDD), and thus to mobile stations and transceivers thereof, which can operate in alternative frequency bands and at the same time also in alternative bandwidths.

The technical background of the invention is described more extensively and in more detail in the publication 24th European Microwave Conference, 5–8 Sep. 1994, Cannes pp. 1575–1580; Kari Lehtinen, Mikko Pesola, Kari Koskela: "High frequency part of a real time test mobile station for UMTS system evaluations". A block diagram of the transceiver of a mobile station shown in FIG. 2 is presented as a simplified version in FIG. 1 of the drawings. Because the invention is particularly related to a synthesizer arrangement in the transceiver, the following description of the block diagram will mainly concentrate on that. A local oscillator frequency is brought to the first mixer M1 of the receiving branch either from synthesizers S1 and S2 equipped with frequency hop or by means of switch SW18 from synthesizers S6 and S7 of the transmission branch, equipped with corresponding frequency hop. Synthesizer S3, which gives the local oscillator frequency to the second mixer M2 of the receiving branch, has a fixed frequency, like synthesizer S4, which gives the local oscillator frequency to the IQDEMOD mixers of the I/Q demodulator. Similarly, baseband signals I and Q to the signal branches are received from the IQDE mixers of the I/Q demodulator. Baseband signals TXI and TXQ, which are formed from signals I and Q, converted to analog and filtered by a filter which is chosen according to the modulation bandwidth, are brought in the transmission branch to the I/Q modulator IQMOD, to the mixers of which the local oscillator frequency is given by a fixed-frequency synthesizer S5. The frequency is raised to a transmission frequency by a mixer M7, to which the local oscillator frequency is given by synthesizers S6 and S7, equipped with frequency hop. Because the use of frequency hop requires the settling of the frequency after the frequency hop before the next burst, synthesizer pairs S1 and S2 and S6 and S7 are used accordingly in the transmission branch, so that when one of them is in use, the other one can search for a new channel and get settled on it before the next burst. The pair of synthesizers can be replaced by one synthesizer, if the settling time requirement does not make it necessary to use two synthesizers.

The transceiver shown in FIG. 1 has been implemented for use in tests, in which the reception and transmission frequency band was 1990.98 to 2007.18 MHz in the TDD mode of operation, and in the FDD mode of operation the transmission frequency band was the same as above, while the reception frequency band was 2181.06 to 2197.26 MHz. The intermediate frequencies used and the synthesizer frequencies or frequency bands have also been marked in FIG. 1. These frequencies are naturally only examples, and in practice the application can also be of the kind that in the FDD mode of operation, both the transmission frequency band and the reception frequency band differ from the frequency band of the TDD mode of operation. In the example of FIG. 1, the FDD mode of operation uses synthesizers S1 and S2 in the receiving branch, and synthesizers S6 and S7 in the transmitting branch, and when switching to the TDD mode of operation, the receiving branch is also switched by means of switches SW16 and SW18 to use synthesizers S6 and S7 instead of synthesizers S1 and S2. At the same time, the bandwidth in the receiving branch can be switched by switches SW5–SW10, and similarly, the modulation bandwidth in the transmitting branch can be switched by switchable filters F12–F15.

In the TDMA transceiver described above as the technical background of the invention, in which the mode of operation can be switched between FDD and TDD, there are separate frequency synthesizers for each local oscillator frequency required both in the receiving and the transmitting branch. The operation has been planned to be such that switching between FDD and TDD modes of operation takes place by changing the synthesizer which gives the first local oscillator frequency in the receiving branch or, in this case, the pair of synthesizers reserved for frequency hop. Another possible implementation is to use a wideband synthesizer in the receiving branch, in which case the mode of operation can be switched by tuning the synthesizer within the limits allowed by its wide tuning area. However, the latter solution has proved to be problematic, and the number of synthesizers required in this solution is relatively high in any case.

SUMMARY OF THE INVENTION

It is an object of the present invention to achieve a transceiver which operates alternatively in the FDD and TDD modes of operation and in different frequency bands, and in which the number of synthesizers required is small, and not much tuning of synthesizers is needed when switching between the FDD and TDD modes of operation and between transmission and reception in the FDD mode of operation.

In order to achieve this object, a transceiver according to the invention, which in the FDD mode of operation receives at the first frequency in the first frequency band and transmits at the second frequency in the second frequency band, and in the TDD mode of operation receives and transmits at the third frequency in the third frequency band, and which incorporates in the receiving branch at least a first mixer for forming the first intermediate frequency from the received frequency and the first local oscillator frequency, and a second mixer for forming the second intermediate frequency from the first intermediate frequency and the second local oscillator frequency, and in the transmitting branch at least a modulator for modulating the baseband signals to be transmitted to the third intermediate frequency, and a third mixer for forming the transmission frequency from the third intermediate frequency and the fourth local oscillator frequency, is characterized in that it includes first synthesizer means by which the first and the fourth local oscillator frequency is formed, and second synthesizer means and a frequency multiplier or divider and switching means for forming and switching the fourth frequency and its M multiple so that the fourth frequency is the absolute value of the difference between the reception frequency and the transmission frequency of the FDD mode of operation divided by (M-1), whereby in the FDD mode of operation the fourth frequency is switched as the third local oscillator frequency, and its said multiple as the second local oscillator frequency, if the reception frequency of the FDD mode of operation is higher than the transmission frequency, and the fourth frequency is switched as the second local oscillator frequency and its said multiple as the third local oscillator frequency, if the reception frequency of the FDD mode of operation is lower than the transmission frequency, and in the TDD mode of operation either the fourth frequency or its said multiple is switched as the second local oscillator frequency and the third local oscillator frequency.

BRIEF DESCRIPTION OF THE DRAWINGS

In the following, the invention will be described in more detail with reference to the appended drawings, in which.

DETAILED DESCRIPTION OF THE INVENTION

Figure 1:
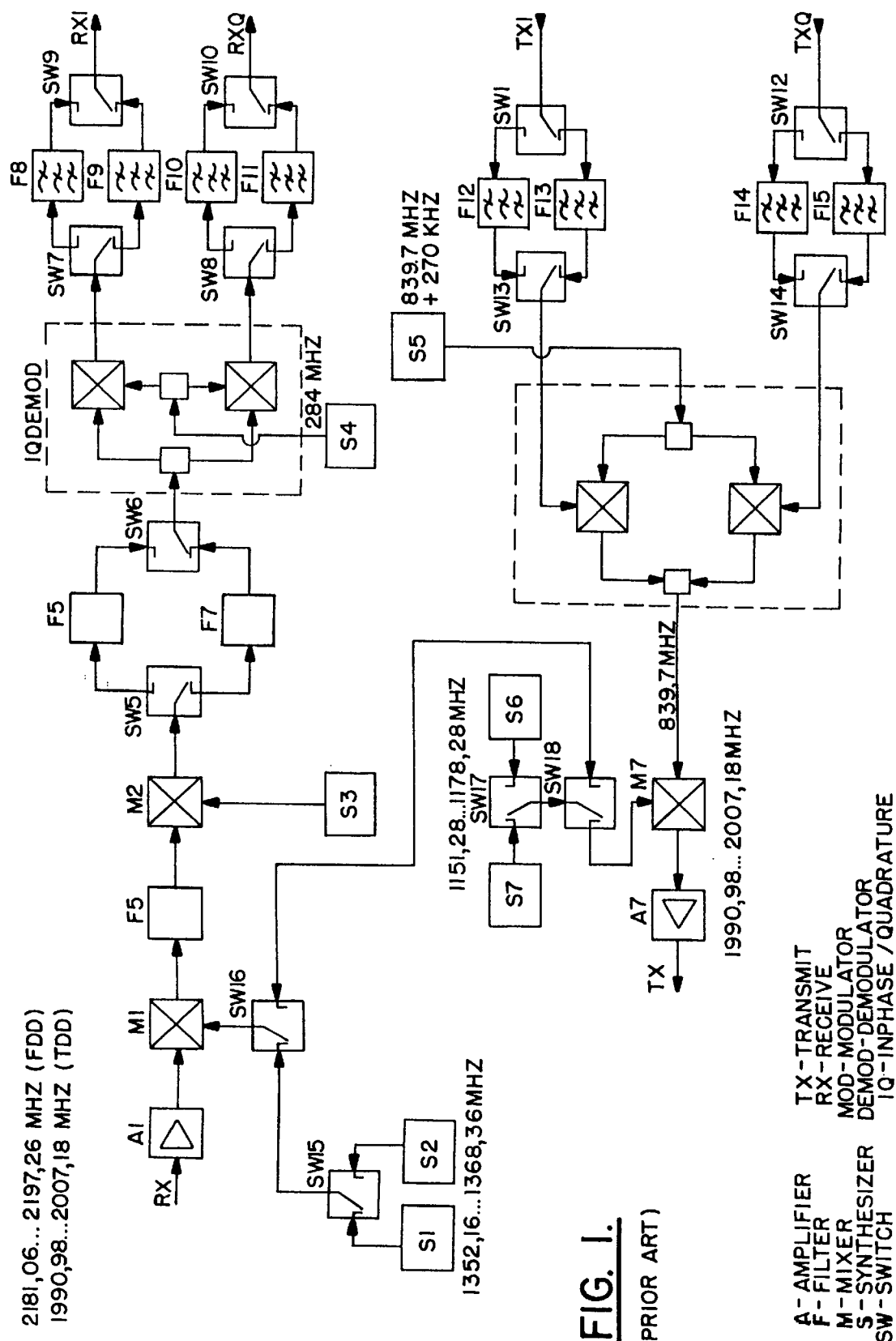
FIG. 1 shows a prior art transceiver and its synthesizer solution.

The prior art transceiver shown in FIG. 1 has been described above in the general part of the specification.

Figure 2:
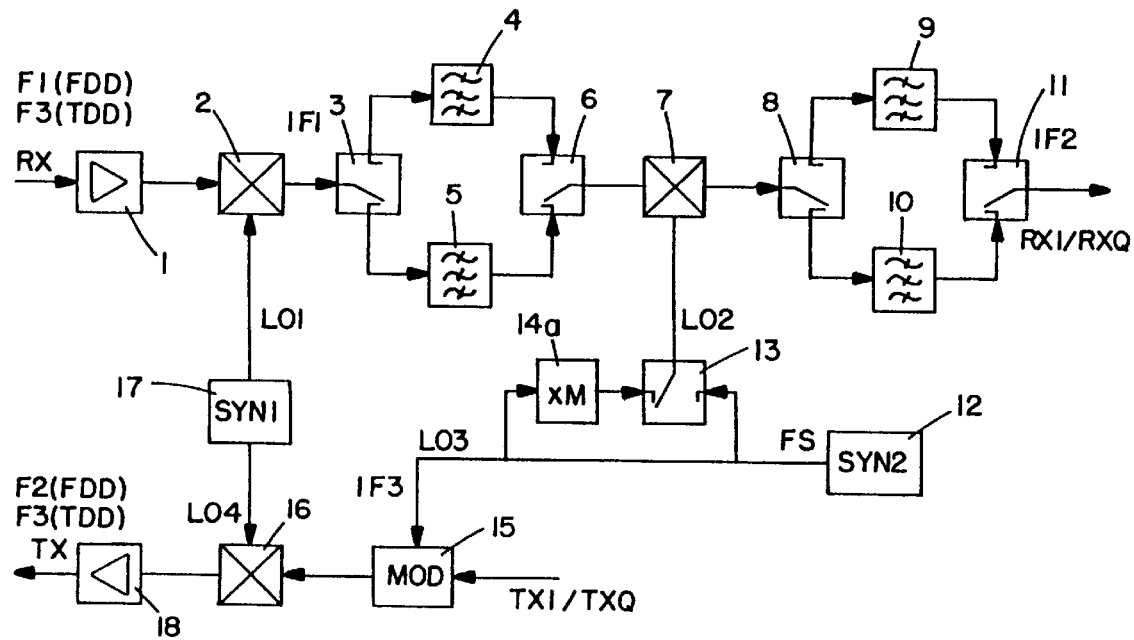
FIG. 2 shows an embodiment of the transceiver according to the invention as a block diagram.

FIG. 2 shows an embodiment of the transceiver according to the invention, in which, in the FDD mode of operation, the signal RX is received at the first frequency F1 in the first frequency band, and the signal TX is transmitted at the second frequency F2, and in the TDD mode of operation, the signals are both received and transmitted at the third frequency F3 in the third frequency band.

The received signal, which is amplified by amplifier 1, is taken in the receiving branch to mixer 2, in which the local oscillator frequency LO1 is mixed into it, thus producing the intermediate frequency IF1. When different bandwidths are used in the FDD and TDD modes of operation, filter 4 or 5 is selected accordingly by switches 3 and 6. The first intermediate frequency is brought to the second mixer 7, in which the local oscillator frequency LO2 is mixed into it, thus producing the second intermediate frequency IF2. A filter 9 or 10 according to the bandwidth can again be selected by switches 8 and 11. In fact, the signal can already at this stage be split into I and Q signals RXI and RXQ, and thus there are two pairs of filters to be selected. Because the I and Q signals are handled in a similar manner, only one signal branch is described here for the sake of simplicity. In the transmitting branch, the baseband I and Q signals TXI and TXQ are brought to the modulator MOD denoted by number 15, in which they are modulated to the intermediate frequency IF3. Again only one signal branch is described here for the sake of simplicity. The received signal of the frequency IF3 and the local oscillator frequency LO4 are mixed in the mixer 16 and taken to the amplifier 18, from which the signal TX to be transmitted is received.

The invention relates particularly to a synthesizer arrangement, which is described hereinbelow, but it is also essential in the invention that only two intermediate frequencies are formed in the receiving branch, the latter of which, F2, is either zero or a relatively low frequency, such as 10 MHz, in the embodiments described in this application. The synthesizer arrangement consists of two synthesizers 17 and 12, and a frequency multiplier 14a and a switch 13 coupled to the synthesizer 12. The frequencies LO1 and LO4 are received from synthesizer 17, and the frequency LO2 and the intermediate frequency IF3 is received from synthesizer 12 by means of switch 13 and frequency multiplier 14a.

If the transceiver is so designed that the second intermediate frequency IF2 is zero, the transceiver according to FIG. 2 operates in the following manner. Switching according to FIG. 2 is used when the reception frequency F1 of the FDD mode of operation is higher than the transmission frequency F2. In the TDD mode of operation, in which the reception and transmission frequencies are the same, the same frequency is taken from the synthesizer as frequency LO1 and LO4, and the frequency FS given by the synthesizer 12 is taken directly as the local oscillator frequency LO3, and by switch 13 as frequency LO2. The synthesizer frequencies are selected suitably, taking into consideration the frequencies used in the FDD mode of operation. When the reception frequency F1 is higher than the transmission frequency F2 in the FDD mode of operation, and it is again desired that the same frequency be switched from synthesizer 17 as frequencies LO1 and LO4, the first intermediate frequency IF1 will be higher than the third intermediate frequency IF3. The idea of the invention is to originally select the frequency FS of the synthesizer 12 such that one of its harmonic frequencies received by a frequency multiplier 14a which multiplies by M, taken as the frequency LO2, is in the FDD mode of operation equal to the intermediate frequency IF1, whereby the second intermediate frequency IF2 is zero, as desired. Thus the following shall apply:

$IF1 = LO2 = M*FS = M*IF3$, and when $IF1 = F1 - LO1$ and $LO1 = F2 - IF3$, then $M*IF3 = F1 - F2 + IF3$ and $IF3 = FS = (F1 - F2)/(M-1)$.

The reception and transmission frequencies can be, for example: F1=2200 MHz, F2=2000 MHz and F3=2050 MHz. If M=2 is selected, the frequency of synthesizer 12 is 200 MHz, and the frequency of synthesizer 17 is 1800 MHz in the FDD mode of operation. In the TDD mode of operation, synthesizer 17 must then be tuned to the frequency 1850 MHz. Switching between the TDD and FDD modes of operation thus takes place by means of switch 13, by which the frequency LO2 is switched between frequency FS of synthesizer 12 and the harmonic frequency received by its frequency multiplier 14a. At the same time, it is also necessary to tune the frequency of synthesizer 17. A very advantageous application is attained if the frequency of the TDD mode of operation is the same as the transmission frequency of the FDD mode of operation, or F2=F3, as in the example of FIG. 1 described above. Thus the frequency of synthesizer 17 need not be changed when switching from the FDD mode of operation to the TDD operation or vice versa.

Figure 3:
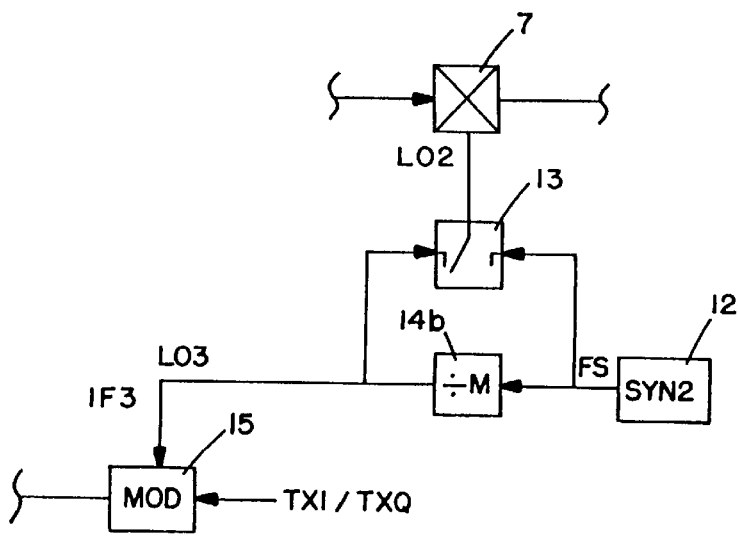
FIGS. 3, 4, 5 and 6 show alternative implementations of a coupling to other synthesizer means of the transceiver shown in FIG. 2.

An alternative implementation of the embodiment shown in FIG. 2 is shown in FIG. 3, in which a frequency divider 14b, dividing by M, is used instead of a frequency multiplier 14a, and the divider 14b is placed in a manner such that both the frequency FS of synthesizer 12 and the divided frequency FS/M thereof are directed to switch 13, and the divided frequency FS/M is also taken as the local oscillator frequency LO3. The formula presented above applies to this, except that now the starting point is IF1=LO2=FS=M*IF3, and the final result is LO3=IF3=FS/M=(F1−F2(/(M−1).

Figure 4:
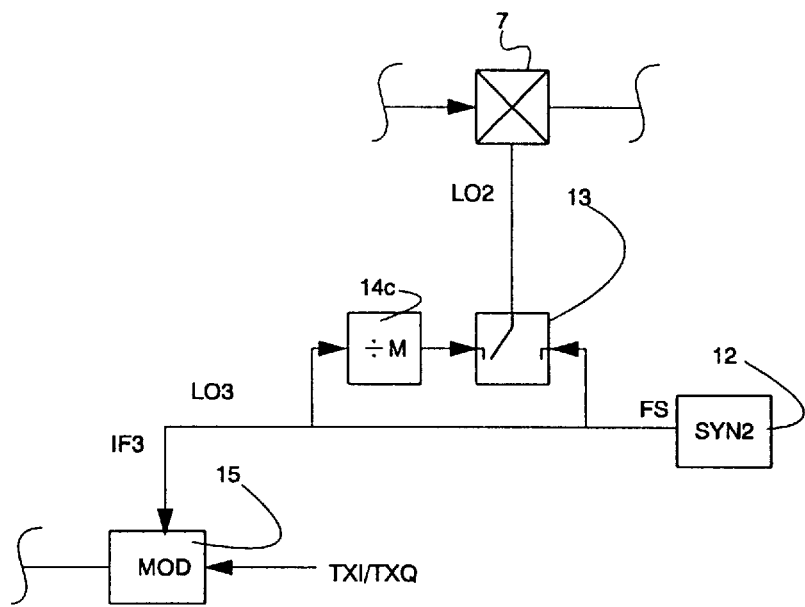

If, in a system environment where the transceiver operates, the reception frequency F1 in the FDD mode of operation is lower than the transmission frequency F2, the frequencies must be formed by means of synthesizer 12 and the frequency multiplier or divider and switch connected thereto so as to use the lower frequency as the frequency LO2 and a suitable multiple thereof as the intermediate frequency IF3. This is achieved, for example, by a coupling according to FIG. 4, in which the frequency FS of synthesizer 12 is taken directly as the local oscillator frequency LO3 and to switch 13, both directly and via a frequency divider 14c which divides by M, whereby FS/M can be switched as the frequency LO2 in the FDD mode of operation. In order to make the second intermediate frequency IF2 zero, the following shall apply:

IF1=LO2=FS/M=IF3/M, and when

IF1=F1−LO1 and LO1=LO3=F2−IF3, then

IF3/M=F1−F2+IF3 or

F2−F1=IF3−IF3/M=(M−1)*IF3/M and

IF3/M=FS/M=(F2−F1)/(M−1).

Figure 5:
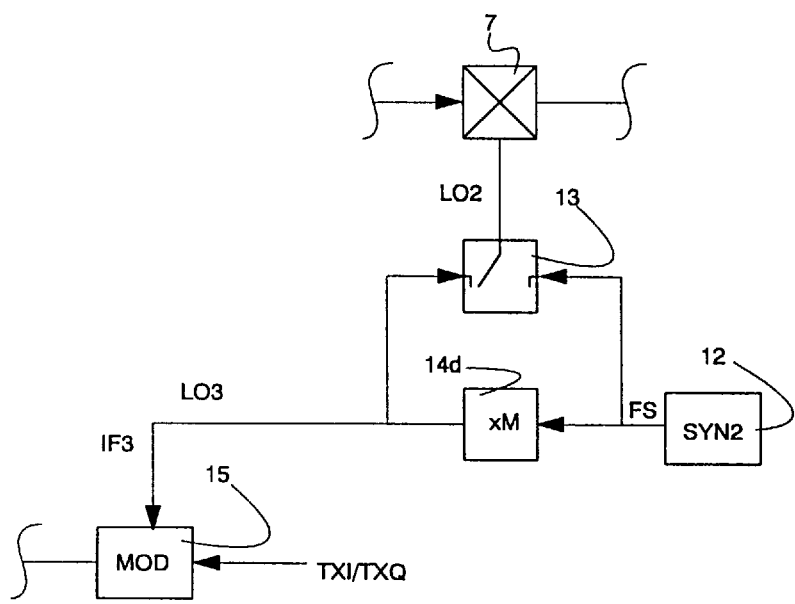

An alternative implementation of this embodiment is shown in FIG. 5, in which a frequency multiplier 14d is used instead of a frequency divider, and the multiplier is placed in a manner such that frequency FS of synthesizer 12 is taken as the local oscillator frequency LO3 through the multiplier 14d, and to switch 13 directly and through the multiplier 14d. The formula presented above applies to this implementation, except that the starting point is IF1=LO2= FS=IF3/M, and the final result is IF3/M=FS=(F2−F1)/(M−1). Also in these embodiments, similarly as in those presented in FIGS. 2 and 3, switching between the FDD and TDD modes of operation takes place by switching the frequency LO2 between frequency FS of synthesizer 12 and a multiplied or divided frequency thereof, M*FS or FS/M, respectively. At the same time, the frequency of synthesizer 17 is tuned according to need. The general principle is that in the TDD mode of operation, the same frequency received by synthesizer 12 is taken both as the frequency LO2 and the local oscillator frequency LO3, and that when switching to the FDD mode of operation, the frequency is switched as LO2=M*LO3, if the reception frequency F1 is higher than the transmission frequency F2, and LO2=LO3/M, if the reception frequency F1 is lower than the transmission frequency F2. A suitable synthesizer frequency FS and an intermediate frequency IF3 have been selected in the manner described above. As a general expression, the synthesizer frequency FS is selected so that either this frequency FS (if a frequency multiplier is used) or a divided frequency FS/M thereof (if a frequency divider is used) is equal to |F1−F2|/(M−1), where M is a suitably selected integer.

Sometimes it may be advantageous that the second intermediate frequency IF2 is not zero but a relatively low frequency, such as 10 MHz. Operation like this can be achieved in the embodiments of the invention presented above by using a frequency hop in synthesizer 17 between transmission and reception. Naturally, this would make full duplex operation impossible, because transmission and reception cannot then take place simultaneously. On the other hand, full duplex operation is not needed in many TDMA systems. If the frequency is F1=2200 MHz, F2=2000 MHz and F3=2050 MHz, as in the example presented in connection with the description of FIG. 2 above, and if it is desired that the second intermediate frequency is IF2=10 MHz, it is advantageous to implement a frequency hop in synthesizer 17 from 1800 MHz to 1810 MHz in the FDD mode of operation and similarly, a frequency hop from 1850 MHz to 1840 MHz in the TDD mode of operation when switching from transmission to reception. By implementing frequency hops of the opposite directions in the FDD and TDD modes of operation, the extension of the tuning area of synthesizer 17 is avoided.

Figure 6:
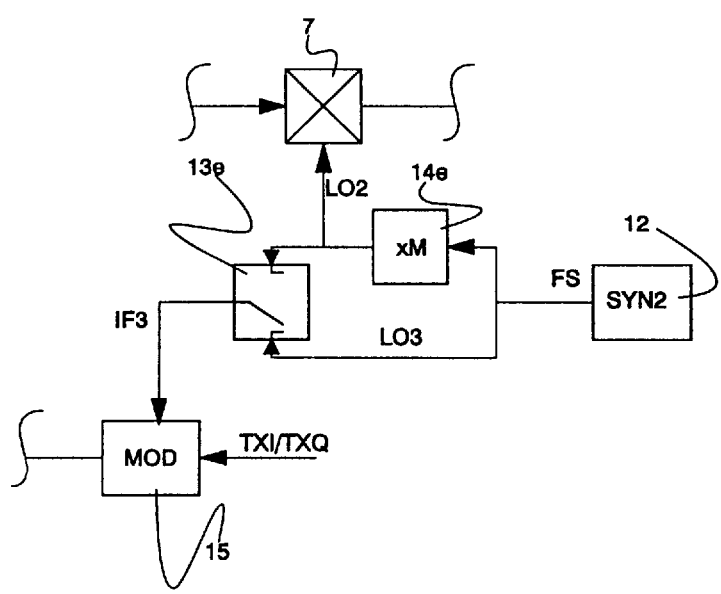

The embodiments of the invention described in FIGS. 2–5 have been implemented in a manner such that the frequency to be taken as the local oscillator frequency LO3 (intermediate frequency IF3) is the same fixed frequency in both FDD and TDD modes of operation, and switching from one mode of operation to another takes place by selecting the frequency LO2 from the two frequencies formed, one of which is the harmonic frequency of the other. If frequency F3 used in the TDD mode of operation is closer to the transmission frequency F2 of the FDD mode of operation than to its reception frequency F1, this implementation is advantageous. But if the situation is the opposite, and particularly if the frequency of the TDD operation is clearly closer to the reception frequency of the FDD operation, it would be advantageous with regard to the tuning area of synthesizer 17 that the selection between the FDD and TDD modes of operation would be made by selecting the local oscillator frequency LO3 from two frequencies formed and by keeping the frequency LO2 fixed in both modes of operation. In order to illustrate this, it can be thought that in the example presented in connection with FIG. 2, the frequency of the TDD mode of operation would be F3=2150 MHz, that is, clearly closer to the reception frequency of the FDD mode of operation. As in the above description, when M=2 is selected in view of the FDD mode of operation, the intermediate frequency IF3 would be 200 MHz, and in the FDD mode of operation the synthesizer 17 would have to be tuned to the frequency 1800 MHz. In the TDD mode of operation, the synthesizer 17 would have to be tuned to the frequency F3−IF3=2150 MHz−200 MHz=1950 MHz, or in other words, the tuning range required would be 150 MHz. But if the switching arrangement built around synthesizer 12 is implemented in a manner such that in the TDD mode of operation it is possible to switch the produced harmonic frequency M*200 MHz or 400 MHz as the frequencies LO3 and LO2, the required local oscillator frequencies LO4 and LO1 will be 2150 MHz−400 MHz=1750 MHz. In this manner, the tuning area required from the synthesizer 17 can be reduced to 50 MHz. If the system environment is like this, it is recommended that the implementation of FIG. 2 be replaced by the implementation shown in FIG. 6, where in both FDD and TDD modes of operation, the harmonic frequency M*FS is taken as the local oscillator frequency LO2, and the frequency of synthesizer 12 is directly selected as the local oscillator frequency LO3 in the FDD mode of operation, and the harmonic frequency M*FS is selected in the TDD mode of operation. In this case, the switching between FDD and TDD modes of operation takes place by switching the local oscillator frequency LO3 by switch 13e between two alternatives formed by means of synthesizer 12 and frequency multiplier 14e and at the same time tuning the frequency of synthesizer 17 according to need. Similarly, the embodiments shown in FIGS. 3 to 5 can be modified by placing the frequency multiplier or divider so that the switch is used to switch the local oscillator frequency LO3 and not the local oscillator frequency LO2.

The embodiment used in each case to implement the invention can be selected from the embodiments described above according to the system environment in which the TDMA transceiver is intended to be used, and particularly according to the frequency bands of the reception and transmission frequencies F1, F2 and F3. As shown above, the implementation can also be made more advantageous by selecting a suitable multiplier or divider M and, for example, by selecting the direction of the frequency hop in the first synthesizer, when it is used between transmission and reception. It is also clear to a person skilled in the art that the essential characteristic of the invention, namely the forming of the frequency and its multiple by means of a synthesizer and a frequency multiplier or divider and the switching thereof by switching means when changing between the FDD and TDD modes of operation, can also be implemented according to the purposes of the invention in many ways other than those presented above. The invention can vary within the scope defined by the attached claims.

What is claim is:

1. A transceiver, which in a Frequency Division Duplex (FDD) mode of operation receives at a first, reception frequency (F1) in a first frequency band and transmits at a second, transmission frequency (F2) in a second frequency band, and in a Time Division Duplex (TDD) mode of operation receives and transmits at a third frequency (F3) in a third frequency band, said transceiver comprising a receiving branch and a transmitting branch, and further comprising:

in the receiving branch, a first mixer (2) for forming a first intermediate frequency (IF1) from a received frequency (F1, f3) and from a first local oscillator frequency (LO1), and a second mixer (7) for forming a second intermediate frequency (IF2) from the first intermediate frequency (IF1) and from a second local oscillator frequency (LO2); and in the transmitting branch, a modulator (15) for modulating signals to be transmitted (TXI, TXQ) to a third intermediate frequency (IF3), a third mixer (16) for forming a transmission frequency (F2, F3) from the third intermediate frequency (IF3) and from a fourth local oscillator frequency (LO4), said transceiver further comprising first synthesizer means (17) for forming equally high first and fourth local oscillator frequencies (LO1, LO4), second synthesizer means (12), and one of a frequency multiplier or divider (14a, 14b, 14c, 14d, 14e) and switching means (13, 13e) for forming and switching a fourth frequency (FS/M, FS) and an M times multiple of the fourth frequency (FS, M*FS), characterized in that the fourth frequency (FS/M, FS) has a magnitude that is an absolute value of a difference between the reception frequency (F1) and the transmission frequency (F2) of the FDD mode of operation divided by (M−1), wherein in the FDD mode of operation the fourth frequency (FS/M, FS) is switched to be the third local oscillator frequency (LO3), and said multiple (FS, M*FS) of the fourth frequency is switched to be the second local oscillator frequency (LO2), if the reception frequency (F1) of the FDD mode of operation is higher than the transmission frequency (F2), wherein the fourth frequency (FS/M, FS) is switched to be the second local oscillator frequency (LO2), and said multiple (FS, M*FS) of the fourth frequency is switched to be the third local oscillator frequency (LO3), if the reception frequency (F1) of the FDD mode of operation is lower than the transmission frequency (F2), and wherein in the TDD mode of operation either the fourth frequency (FS/M, FS) or said multiple (FS, M*FS) of the fourth frequency is switched to be both the second local oscillator frequency (LO2) and the third local oscillator frequency (LO3).

2. A transceiver according to claim 1, characterized in that the switching means (13, 13e) operate to switch the second local oscillator frequency (LO2) between the fourth frequency (FS/M, FS) and said multiple (FS, M*FS) of the fourth frequency, if the third frequency (F3) is closer to the second frequency (F2) than to the first frequency (F1), and further operate to switch the third local oscillator frequency (LO3) between the fourth frequency (FS/M, FS) and said multiple (FS, M*FS) of the fourth frequency, if the third frequency (F3) is closer to the first frequency (F1) than to the second frequency (F2).

3. A transceiver according to claim 1, characterized in that the first synthesizer means (17) are tunable for switching between the first and the fourth local oscillator frequencies (LO1, LO4) when changing between the FDD and TDD modes of operation.

4. A transceiver according to claim 1, characterized in that the first synthesizer means (17) are operated to perform a frequency hop between transmission and reception.

5. A transceiver as in claim 1, wherein when operating in the FDD mode the first synthesizer means (17) are operated to perform a frequency hop in a first direction between transmission and reception, and when operating in the TDD mode the first synthesizer means (17) are operated to perform a frequency hop in a second, opposite direction between transmission and reception.

* * * * *